United States Patent
Ogawa et al.

(10) Patent No.: US 7,664,954 B2
(45) Date of Patent: Feb. 16, 2010

(54) PROVIDING APPARATUS, PROVIDING METHOD, COMMUNICATION DEVICE, COMMUNICATION METHOD, AND PROGRAM

(75) Inventors: Katsuhisa Ogawa, Machida (JP); Naohiko Suzuki, Bunkyo (JP); Hiroaki Nakazawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 664 days.

(21) Appl. No.: 11/086,634

(22) Filed: Mar. 22, 2005

(65) Prior Publication Data

US 2005/0223228 A1 Oct. 6, 2005

(30) Foreign Application Priority Data

Mar. 31, 2004 (JP) ............................ 2004-104635

(51) Int. Cl.
*H04L 9/32* (2006.01)
(52) U.S. Cl. .................. 713/169; 713/170; 709/223; 380/37; 705/64
(58) Field of Classification Search .................. 713/151, 713/153, 169–170, 160–161; 370/392, 401, 370/445; 726/3, 11; 709/223; 705/52, 64; 380/37
See application file for complete search history.

(56) References Cited

U.S. PATENT DOCUMENTS

| | | | | |
|---|---|---|---|---|
| 6,134,662 A | * | 10/2000 | Levy et al. | 726/11 |
| 6,966,003 B1 | * | 11/2005 | Joseph et al. | 726/14 |
| 7,061,899 B2 | * | 6/2006 | Walker et al. | 370/351 |
| 2001/0042201 A1 | | 11/2001 | Yamaguchi et al. | |
| 2001/0047474 A1 | | 11/2001 | Takagi et al. | |

FOREIGN PATENT DOCUMENTS

| | | |
|---|---|---|
| JP | 2001-298449 A | 10/2001 |
| JP | 2001-333110 A | 11/2001 |
| JP | 2002-271309 A | 9/2002 |

OTHER PUBLICATIONS http://rfc.net/rfc2409.html (Link to RFC 2409).
http://rfc.net/rfc2543.html (Link to RFC 2543).
Tamura, Yanagiya, Bessho, Takagi, A study on secured VoIP services with IP mobility technologies, Mar. 2003, pp. 319-322, NTT Network systems Laboratories, Tokyo, Japan.

* cited by examiner

*Primary Examiner*—Thanhnga B Truong
(74) *Attorney, Agent, or Firm*—Canon USA, Inc. IP Division

(57) ABSTRACT

A providing apparatus that provides information required for a secure communication to first and second devices includes a receiving unit for receiving candidates for parameters used for the secure communication from the first and second devices; a generating unit for generating the information required for the secure communication based on the candidates for the parameters received from the first and second devices; and a transmitting unit for transmitting the information required for the secure communication, generated by the generating unit, to the first and second devices.

7 Claims, 10 Drawing Sheets

FIG. 10 spdadd<A_addr>[<A_port>]<B_addr>[<B_port>]any-P out ipsec<sec_type>/transport//<sec_level>...;
spdadd<B_addr>[<B_port>]<A_addr>[<A_port>]any-P in ipsec<sec_type>/transport//<sec_level>...;
add<A_addr><B_addr>ah<B_spi>-A<ah_algo><ah_key>;
add<A_addr><B_addr>esp<B_spi>-E<esp_algo><esp_key>;
add<B_addr><A_addr>ah<A_spi>-A<ah_algo><ah_key>;
add<B_addr><A_addr>esp<A_spi>-E<esp_algo><esp_key>;

FIG. 11

```
<ipsec-response>
  <ipsec-data>
spdadd 2002:200::1[46127]3ffe:514::1[180]any-p out ipsec esp/transport//require ah/transport//require;
spdadd 3ffe:514::1[80]2002:200::1[46127]any-p in ipsec esp/transport//require ah/transport//require;
add 2002:200::1 3ffe:514::1 ah 0x44c-A hmac-sha1 0x94ace39e5fc7372be03b4a3bf232056a2630ce47;
add 2002:200::1 3ffe:514::1 esp 0x44d-E 3des-cbc 0x2630ce4744950e8e117e3f22cdd5defc94ace39e5fc7372b;
add 3ffe:514::1 2002:200::1 ah 0x834-A hmac-sha1 0x94ace39e5fc7372be03b4a3bf232056a2630ce47;
add 3ffe:514::1 2002:200::1 esp 0x835-E 3des-cbc 0x2630ce4744950e8e117e3f22cdd5defc94ace39e5fc7372b;
  </ipsec-data>
</ipsec-response>
```

PROVIDING APPARATUS, PROVIDING METHOD, COMMUNICATION DEVICE, COMMUNICATION METHOD, AND PROGRAM

BACKGROUND OF THE INVENTION

1. Field of the Invention

The present invention relates to a providing apparatus and a providing method that provide information required for a secure communication between a first device and a second device to the first and second devices, a communication device and a communication method that receive information required to ensure secure communication with the communication partner from the providing apparatus, and a program for realizing the providing method or the communication method.

2. Description of the Related Art

Security architecture for Internet protocol (IPsec) is a standardized protocol having enough functions and safety to ensure the security in a general Internet protocol (IP) layer. The core of the IPsec is automatic generation of a security association (SA) conforming to an Internet key exchange (IKE) protocol defined in RFC2409 "The Internet key exchange (IKE)". The SA is established in two phases: Phase1 (or Internet security association and key management protocol (ISAKMP) SA) and Phase2 (or IPsec SA). The IPsec is disclosed in, for example, U.S. 2001042201.

In the Phase1 in an aggressive mode, an encryption algorithm for an IKE communication channel is selected in the first round-trip, key (key for IKE communication) exchange is performed in a Diffie-Hellman (DH) key exchange algorithm in the second round-trip, and the communication partner is authenticated in the third round-trip. In the Phase2, encryption algorithms or secret keys used in the encapsulating security payload (ESP) or the authentication header (AH) of a security protocol are exchanged using a secret communication channel, established in Phase1, in the first round-trip to transmit the subsequent connection acknowledgement only as transmission. The setting information exchanged in the above manner is registered as SA entries in security association databases (SAD) of the corresponding terminal devices and is utilized in secure communications between the terminal devices.

The IPsec communication is standardized so as to be automatically set between the corresponding terminal devices. However, some pre-settings are required.

Authentication by a pre-shared key method is generally supported as the authentication performed in the third round-trip in Phase1. In the pre-shared key method, it is presumed that a shared key, which is effective only between the two terminal devices performing the secure communication, is directly set for the corresponding devices by a skilled manager. Accordingly, although the pre-shared key method is operational between a few specified devices, it is difficult to operate the pre-shared key method between an unspecified number of devices.

For example, the DH key exchange algorithm and a public key encryption algorithm used in the IPsec are complicated and it takes a few seconds or more to process the IPsec in a mobile terminal or the like, which has a relatively little CPU power. Hence, in devices with relatively little CPU power, it is necessary to use a dedicated arithmetic chip, which creates implementation problems.

SUMMARY OF THE INVENTION

The present invention provides a providing apparatus and a providing method, a communication device and a communication method, and a program, in which secure communication can be simply ensured.

The present invention provides a providing apparatus, a providing method, and a program that receive candidates for parameters used for a secure communication from first and second devices, generate information required for the secure information based on the candidates for the parameters received from the first and second devices, and transmit the generated information required for the secure communication to the first and second devices.

The present invention provides a communication device, a communication method, and a program that transmit candidates for parameters used to ensure secure communication to a providing apparatus, receive information required to ensure secure communication from the providing apparatus, and ensure, based on the information received from the providing apparatus, that the communication with the communication partner is secure.

Further features and advantages of the present invention will become apparent from the following description of exemplary embodiments with reference to the attached drawings.

BRIEF DESCRIPTION OF THE DRAWINGS

FIG. 10 shows an example of an IPsec setting template.

FIG. 11 shows examples of the IPsec settings.

DESCRIPTION OF THE EMBODIMENTS

Embodiments of the present invention will be described in detail below with reference to the attached drawings.

Figure 1:
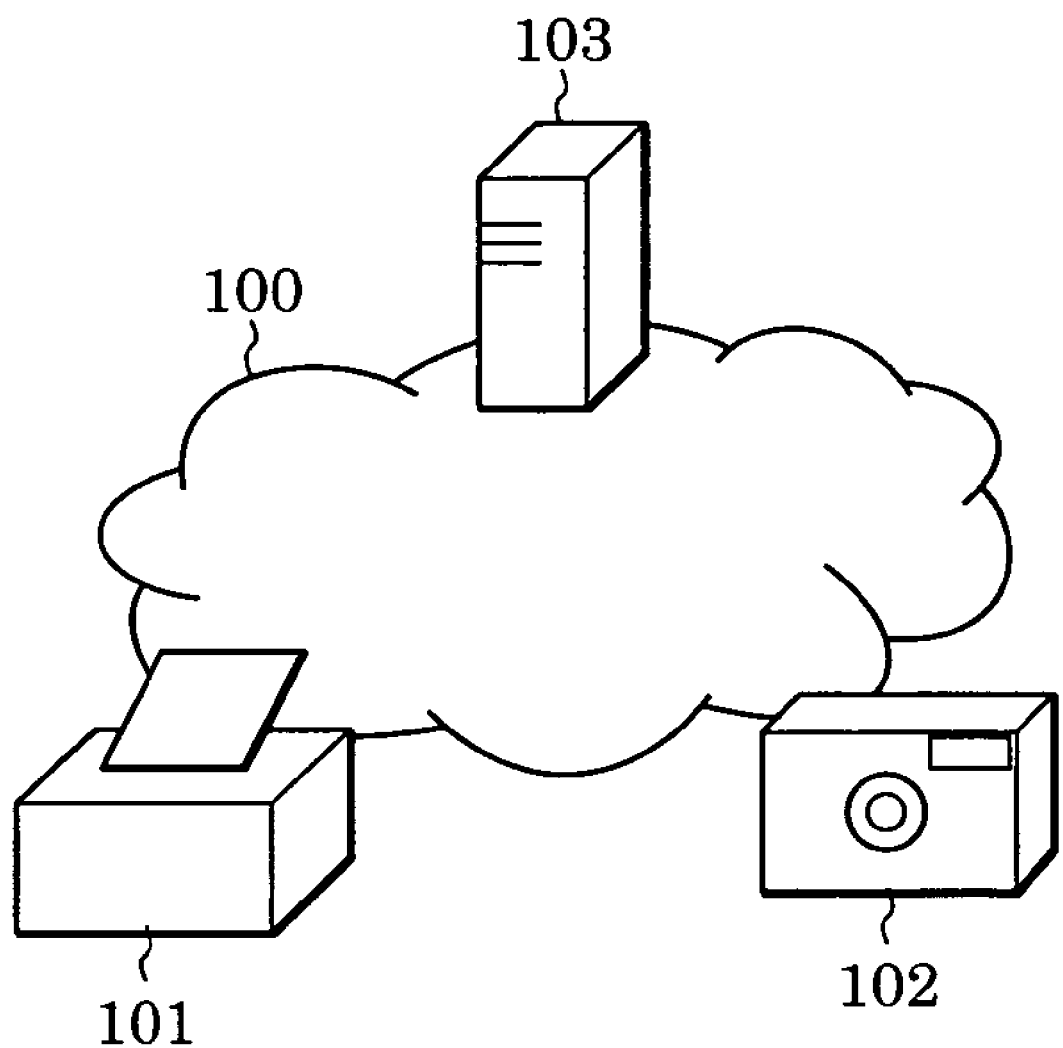
FIG. 1 illustrates the structure of a network according to an embodiment of the present invention.

FIG. 1 illustrates the structure of a network according to an embodiment of the present invention. Referring to FIG. 1, communication using an Internet protocol version 6 (IPv6) can be performed over the Internet 100. A printer 101 is directly or indirectly connected to the Internet 100 and performs the communication using the IPv6 over the Internet 100. A digital camera 102 is directly or indirectly connected to the Internet 100 and performs the communication using the IPv6 over the Internet 100.

A security management server 103, which is connected to the Internet 100, manages the security in a peer-to-peer communication with the printer 101 or the digital camera 102 over the Internet 100. The security management server 103 holds detailed information concerning the printer 101 and the digital camera 102. The security is ensured in the communication between the security management server 103 and the printer 101 or the digital camera 102 over the Internet 100. Specifically, the security management server 103 and the printer 101 are provided with common authentication and encryption keys against leakage of the information. The security management server 103 and the printer 101 perform authentication associated with the communication and encryption of the content of the communication based on the information concerning the authentication and encryption keys.

The printer 101 and the digital camera 102 can perform the peer-to-peer communication using the IPv6. Address registration (session initiation protocol (SIP) Register) in the security management server 103 has been performed by the printer 101 and the digital camera 102. The digital camera 102 transmits a session request (SIP Invite) to the printer 101 to establish a session for the peer-to-peer communication between the printer 101 and the digital camera 102. After the session is established, the peer-to-peer communication can be performed between the printer 101 and the digital camera 102 using an appropriate application. According to this embodiment, the security management server 103 also serves as an SIP server. The SIP is defined in RFC2543.

Network information concerning the printer 101, the digital camera 102, and the security management server 103 in the network shown in FIG. 1 will now be described.

For example, the printer 101 has a device ID BJ001 and the digital camera 102 has a device ID DC101. These device IDs are used as the identifiers of the printer 101 and the digital camera 102 in the security management server 103. The device IDs are also used as SIP uniform resource identifiers (URIs) in the SIP communication for the peer-to-peer communication between the printer 101 and the digital camera 102. The respective IPv6 addresses of the printer 101, the digital camera 102, and the security management server 103 are 3ffe:514::1, 2002:200::1, and 2001:340::1. The device IDs and the IPv6 addresses of the printer 101 and the digital camera 102 are registered in the security management server 103.

The security management server 103 is an intermediary apparatus for establishing a session (communication) between the digital camera 102 and the printer 101. The security management server 103 converts the device ID (identifier) of the printer 101 included in the session request from the digital camera 102 into an IP address of the printer 101. The session is established between the digital camera 102 and the printer 101 based on this IP address.

The security management server 103 is a providing apparatus for providing information required for a secure communication to the digital camera (first device) 102 and the printer (second device) 101. The security management server 103 receives the candidates for parameters used for the secure communication from the digital camera 102 and the printer 101, generates information required for the secure communication based on the candidates for the parameters received from the digital camera 102 and the printer 101, and transmits the generated information required for the secure communication to the digital camera 102 and the printer 101.

Furthermore, the security management server 103 receives identification information that identifies the communication between the digital camera 102 and the printer 101, from the digital camera 102 and the printer 101, and transmits the generated information required for the secure communication to the digital camera 102 and the printer 101 in order to ensure the security of the communication identified by the identification information.

The printer 101 and the digital camera 102 are communication devices that receive information required to ensure the security of the communication with the communication partner from the security management server (providing apparatus) 103. Both the printer 101 and the digital camera 102 transmit the candidates for the parameters used to ensure the security to the security management server 103, receive the information used to ensure the security from the security management server 103, and ensure the security of the communication with the communication partner based on the information received from the security management server 103.

Furthermore, both the printer 101 and the digital camera 102 transmit the identification information that identifies the established communication with the communication partner to the security management server 103 and ensure the security of the established communication with the communication partner based on the information received from the security management server 103.

The candidates for the parameters used for the secure communication are, for example, the candidates for at least one of an authentication algorithm and an encryption algorithm, which is provided to ensure the security.

The information required to ensure the security is at least one of the authentication algorithm and the encryption algorithm provided to ensure the security or a key used to ensure the security.

Figure 2:
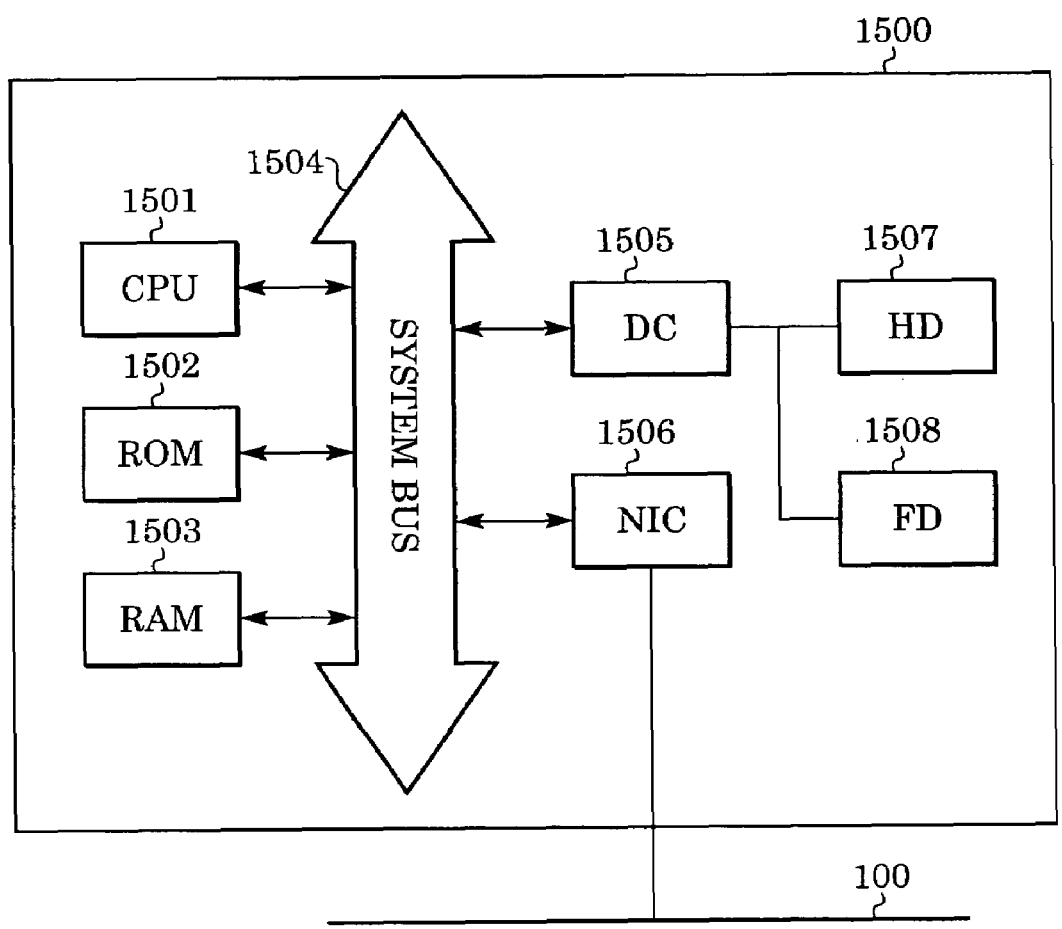
FIG. 2 shows an example of the hardware structure in which a software program for realizing the functions according to the embodiment is executed.

FIG. 2 shows an example of the hardware structure in which a software program for realizing the functions according to this embodiment is executed. Although an example of the hardware structure in which a computer 1500 is the security management server 103 is shown in FIG. 2, the printer 101 and the digital camera 102 can have the same structure with a printing unit and an imaging unit being added.

The computer 1500 includes a central processing unit (CPU) 1501, a read only memory (ROM) 1502, a random access memory (RAM) 1503, a disk controller (DC) 1505 for controlling a hard disk (HD) 1507 and a floppy disk (FD) 1508, and a network interface card (NIC) 1506, which are connected to each other via a system bus 1504 so as to communicate with each other. The system bus 1504 is connected to the Internet 100 in FIG. 1 via the NIC 1506.

The CPU 1501 executes software stored in the ROM 1502 or the HD 1507, or software supplied from the FD 1508 to comprehensively control each component connected to the system bus 1504. In other words, the CPU 1501 controls each component by reading out the processing program, which follows processing sequences described below, from the ROM 1502, HD 1507, or the FD 1508 and executing the readout program in order to realize the operation according to this embodiment. The RAM 1503 functions as a main memory or a work area of the CPU 1501. The DC 1505 controls a boot program, various applications, edit files, user files, a network management program, and access to the HD 1507 and the FD 1508, which store the processing program according to this embodiment. The NIC 1506 performs intercommunication using the IPv6 over the Internet 100.

The security management server 103, which is the providing apparatus for providing the information required for the secure communication to the digital camera (first device) 102 and the printer (second device) 101, has the NIC 1506, which receives the candidates for the parameters used for the secure communication from the digital camera 102 and the printer 101, and the CPU 1501, which generates the information required for the secure communication based on the candidates for the parameters received from the digital camera 102 and the printer 101. The NIC 1506 is a transmission means for transmitting the generated information required for the secure communication to the digital camera 102 and the printer 101. The NIC 1506 receives a session request message (e.g., Invite request message) to request the establishment of the session with the printer 101 from the digital camera 102. The CPU 1501 converts the device ID (identifier) of the printer 101 included in the session request message into the IP address of the printer 101 to serve as the intermediary apparatus for the establishment of the session (communication) between the digital camera 102 and the printer 101.

Furthermore, the NIC 1506 in the security management server 103 receives the identification information that identifies the communication between the digital camera 102 and the printer 101 from the digital camera 102 and the printer 101 and transmits the generated information required for the secure communication to the digital camera 102 and the printer 101 in order to ensure the security of the communication identified by the identification information.

The printer 101 and the digital camera 102 are the communication devices that receive the information required to ensure the security of the communication with the communication partner from the security management server (providing apparatus) 103. Both the printer 101 and the digital camera 102 have the NIC 1506, which transmits the candidates for the parameters used to ensure the security to the security management server 103 and receives the information required to ensure the security from the security management server (providing apparatus) 103, and a CPU 1501, which ensures the security of the communication with the communication partner based on the information received from the security management server 103 by the NIC 1506.

The NICs 1506 in both the printer 101 and the digital camera 102 transmit the identification information that identifies the established communication with the communication partner to the security management server 103. The CPU 1501 ensures the security of the established communication with the communication partner based on the information received from the security management server 103. The NIC 1506 in the digital camera 102 transmits the request message (Invite request message) to request the establishment of the session (communication) with the printer 101 to the security management server 103.

The candidates for the parameters used for the secure communication are, for example, the candidate for at least one of the authentication algorithm and the encryption algorithm, which is provided to ensure the security.

The information required to ensure the security is at least one of the authentication algorithm and the encryption algorithm provided to ensure the security or a key used to ensure the security.

Figure 3:
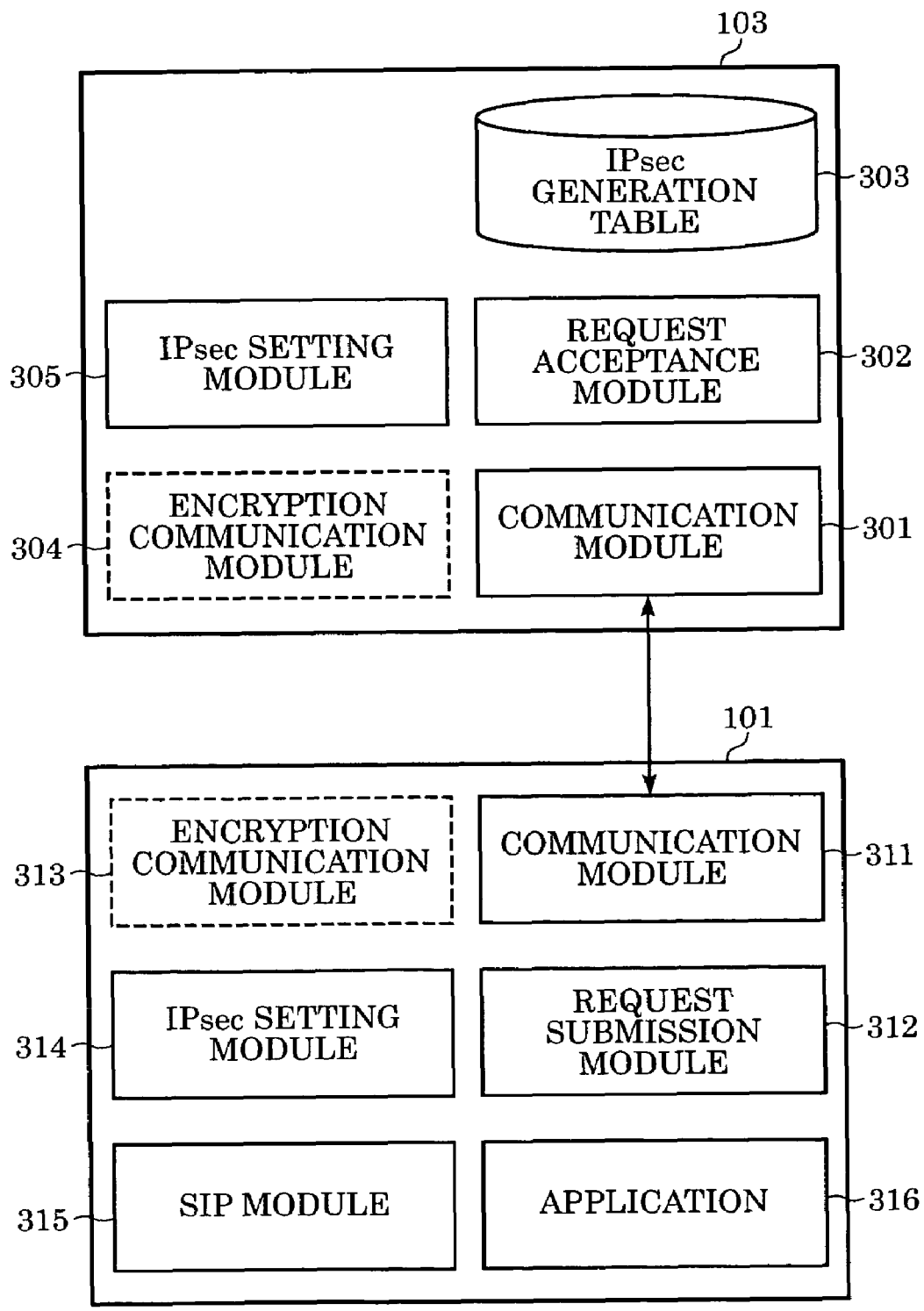
FIG. 3 shows the structures of modules in a printer and a security management server.

FIG. 3 shows the structures of modules in the printer 101 and the security management server 103. The security management server 103 has modules 301 to 305 and the printer 101 has modules 311 to 316. The digital camera 102 has the same structure of modules as in the printer 101.

A communication module 301 is used to receive an IPsec request message from the printer 101 and transmit IPsec settings to the printer 101 through the NIC 1506. A request acceptance module 302 accepts the IPsec request message transmitted from the printer 101. An IPsec generation table 303 manages and stores information concerning sessions between the devices, acquired from the IPsec request message in the request acceptance module 302, and IPsec-related information concerning the devices. The IPsec generation table 303 will be described in detail below with reference to FIG. 5. An encryption communication module 304 is used to transmit and receive messages to and from the printer 101 through a secure communication channel that is set in advance. An IPsec setting module 305 is used to create IPsec settings used in the printer 101 from the information in the IPsec generation table 303.

A communication module 311 is used to receive the IPsec request message from the security management server 103 and to transmit the IPsec settings to the security management server 103 through the NIC 1506. The communication module 311 is equivalent to the communication module 301. A request submission module 312 generates the IPsec request message. The IPsec request is submitted by the request submission module 312 and the IPsec settings is acquired from the security management server 103.

An encryption communication module 313 is used to transmit and receive messages to and from the security management server 103 through the secure communication channel that is set in advance. The encryption communication module 313 is equivalent to the encryption communication module 304. The encryption communication module 304 in the security management server 103 communicates with the encryption communication module 313 in the digital camera 102 through a communication channel formed by using the respective first secret symmetric keys. The encryption communication module 304 in the security management server 103 communicates with the encryption communication module 313 in the printer 101 through a communication channel formed by using the respective second secret symmetric keys.

An IPsec setting module 314 sets the IPsec settings created in the IPsec setting module 305 in the printer 101.

An SIP module 315 is used in the establishment of a session for the peer-to-peer communication using the SIP when the printer 101 performs the peer-to-peer communication with the digital camera 102. The printer 101 registers the IPv6 address (3ffe:514::1), which is automatically set upon connection to the Internet 100, in the security management server 103 along with its own device ID (BJ101). As a result, the SIP URI (for example, BJ101@device.ccc.com) and the IPv6 address of the printer 101 are managed in the security management server 103.

Similarly, the digital camera 102 registers the SIP URI and IPv6 address of the digital camera 102 in the security management server 103. The digital camera 102 transmits the session request message (SIP Invite) to the printer 101 through the security management server 103 by using the registered SIP URI of the printer 101 to perform negotiation for the establishment of a session and exchange the ID information with the printer 101 in order to establish the session. The above SIP processing is performed in the SIP module 315. A process of establishing a session will be described in detail below with reference to FIG. 4.

An application 316 is used for the peer-to-peer communication between the printer 101 and another device (for example, the digital camera 102).

Figure 4:
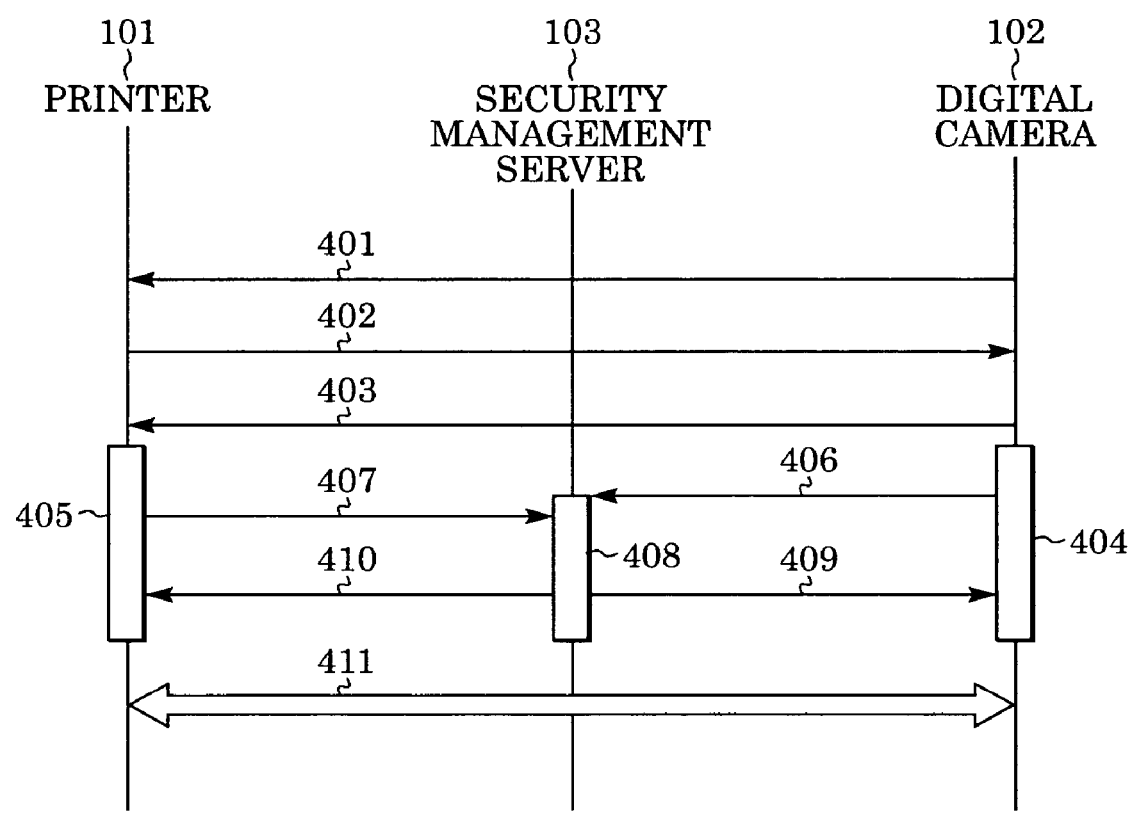
FIG. 4 shows a sequence according to an embodiment.

FIG. 4 shows a sequence according to an embodiment of the present invention. This sequence shows a process of performing the peer-to-peer communication from the digital camera 102 to the printer 101. It is presumed that the registration process (SIP Register) for the SIP communication has been already completed in this sequence.

The digital camera 102 transmits an Invite request message 401 to request the establishment of a session to the printer 101 through the security management server 103. The Invite request message 401 to request the establishment of a session includes a session ID (identification information identifying the communication) of the session (communication) to be established. In the Invite request message 401, address information and application information (port number) concerning the digital camera 102 in the peer-to-peer communication between the digital camera 102 and the printer 101 and security information required for a secure peer-to-peer communication are described in a session description protocol (SDP) and attached. The SDP is read out from, for example, the HD 1507.

The printer 101 transmits a response message 402 to the digital camera 102 through the security management server 103 as a reply to the received Invite request message 401. The response message 402 is, for example, a "200OK" (hereinafter referred to as a 200OK message) that permits the acceptance of the session. A variety of information described in the SDP, which is required for the peer-to-peer communication with the digital camera 102, is included in the response message 402. The SDP description is read out from, for example, HD 1507. The response message 402 also includes an error message. If the session cannot be accepted (for example, when a session with another device is being established and a new session with the digital camera 102 cannot be established or when a request for a function that is not supported in the printer 101 is included in the SDP information transmitted from the digital camera 102), an error message is transmitted as the response message 402.

The digital camera 102, which receives the 200OK message 402 in response to the Invite request message 401, transmits an Ack message 403 that indicates the acceptance of the 200OK message 402 to the printer 101. As a result of the transmission of the Ack message 403 from the digital camera 102 to the printer 101, the session for the peer-to-peer communication is established between the digital camera 102 and the printer 101. Even if the response message 402 is an error message rejecting the acceptance of the session, the Ack message 403 is transmitted.

The session (communication) between the digital camera 102 and the printer 101 is established through the security management server 103. In other words, the device ID (identifier) of the printer 101, included in the Invite request message (session request) 401 transmitted from the digital camera 102, is converted into the IP address of the printer 101. The session between the digital camera 102 and the printer 101 is established based on the IP address.

The digital camera 102 starts an IPsec request process 404 for the peer-to-peer communication with the printer 101 using the transmission of the Ack message 403 as a trigger. Specifically, the SIP module 315 submits the IPsec request to the request submission module 312. Similarly, the printer 101 starts an IPsec request process 405 for the peer-to-peer communication with the digital camera 102 using the reception of the Ack message 403 as a trigger.

In the IPsec request process 404 in the digital camera 102, the digital camera 102 determines whether the secure communication using the IPsec is to be performed in the peer-to-peer communication between the digital camera 102 and the printer 101. If the IPsec is used, the digital camera 102 transmits an IPsec request message 406 to the security management server 103. Similarly, in the IPsec request process 405 in the printer 101, the printer 101 determines whether the secure communication using the IPsec is to be performed in the peer-to-peer communication between the digital camera 102 and the printer 101. If the IPsec is used, the printer 101 transmits an IPsec request message 407 to the security management server 103. The IPsec request processes 404 and 405 will be described in detail below with reference to FIGS. 6 and 7. As described below, the printer 101 and the digital camera 102, which are the communication devices that receive the information required to ensure the security of the communication with the communication partner from the security management server (providing apparatus) 103, transmit the IPsec request messages 406 and 407 including the candidates for the parameters used to ensure the security to the security management server 103.

The security management server 103, which receives the IPsec request message 406 and 407, analyzes the IPsec request messages 406 and 407, creates the IPsec settings, and returns the IPsec settings to each device, these processes being denoted by reference numeral 408, after receiving the IPsec request messages from the two devices between which the peer-to-peer communication is to be established. These processes will be described in detail below with reference to FIGS. 8 and 9. As described below, the security management server 103, which is the providing apparatus that provides the information required for the secure communication to the first and second devices, receives the IPsec request messages 406 and 407 including the candidates for the parameters used for the secure communication from the digital camera (first device) 102 and the printer (second device) 101, creates the IPsec settings (the information required for the secure communication) based on the candidates for the parameters received from the digital camera 102 and the printer 101, and transmits the IPsec settings to the digital camera 102 and the printer 101.

The security management server 103 transmits the created IPsec settings of each device as replies 409 and 410 to the IPsec request messages to the corresponding digital camera 102 and the printer 101. The digital camera 102 receives the IPsec settings as the reply 409 to the IPsec request message and sets the IPsec. Similarly, the printer 101 receives the IPsec settings as the reply 410 to the IPsec request message and sets the IPsec. After the IPsec is set, a secure peer-to-peer communication 411 between the digital camera 102 and the printer 101 is started. The printer 101 and the digital camera 102, which are the communication devices that receive the information required to ensure the security of the communication with the communication partner from the security management server (providing apparatus) 103, receive the IPsec settings (the information required to ensure the security) from the security management server 103 and ensure the security of the communication with the communication partner based on the IPsec settings received from the security management server 103.

In other words, FIG. 4 shows a process of setting a session key and security setting information that are required to realize the secure communication using the IPsec between the digital camera (first device) 102 and the printer (second device) 101.

The security management server (SIP server) 103 relays the Invite request message (connection calling message) 401 transmitted from the digital camera (first device) 102 to the printer (second device) 101 and relays the response message (connection response message) 402 transmitted from the printer 101 to the digital camera 102.

The security management server 103 acquires security setting candidate information concerning the digital camera 102, included in the IPsec request message (encryption-communication-setting request message) 406 transmitted from the digital camera 102 and acquires security setting candidate information concerning the printer 101, included in the IPsec request message (encryption-communication-setting request message) 407 transmitted from the printer 101.

The security management server 103 generates the respective IPsec settings (encryption keys (session keys) used in the encryption communication and security setting information) for the digital camera 102 and the printer 101 after the IPsec request message 406 and the IPsec request message 407 are received from the digital camera 102 and the printer 101, respectively.

The security management server 103 transmits, to the digital camera 102, the IPsec settings 409 for the digital camera 102 through the communication channel formed by using the first secret symmetric keys owned by the security management server 103 and the digital camera 102. The security management server 103 transmits, to the printer 101, the IPsec settings 410 for the printer 101 through the communication channel formed by using the second secret symmetric keys owned by the security management server 103 and the printer 101.

The encryption communication using the IPsec between the digital camera 102 and the printer 101 is stared based on the received IPsec settings.

Figure 5:
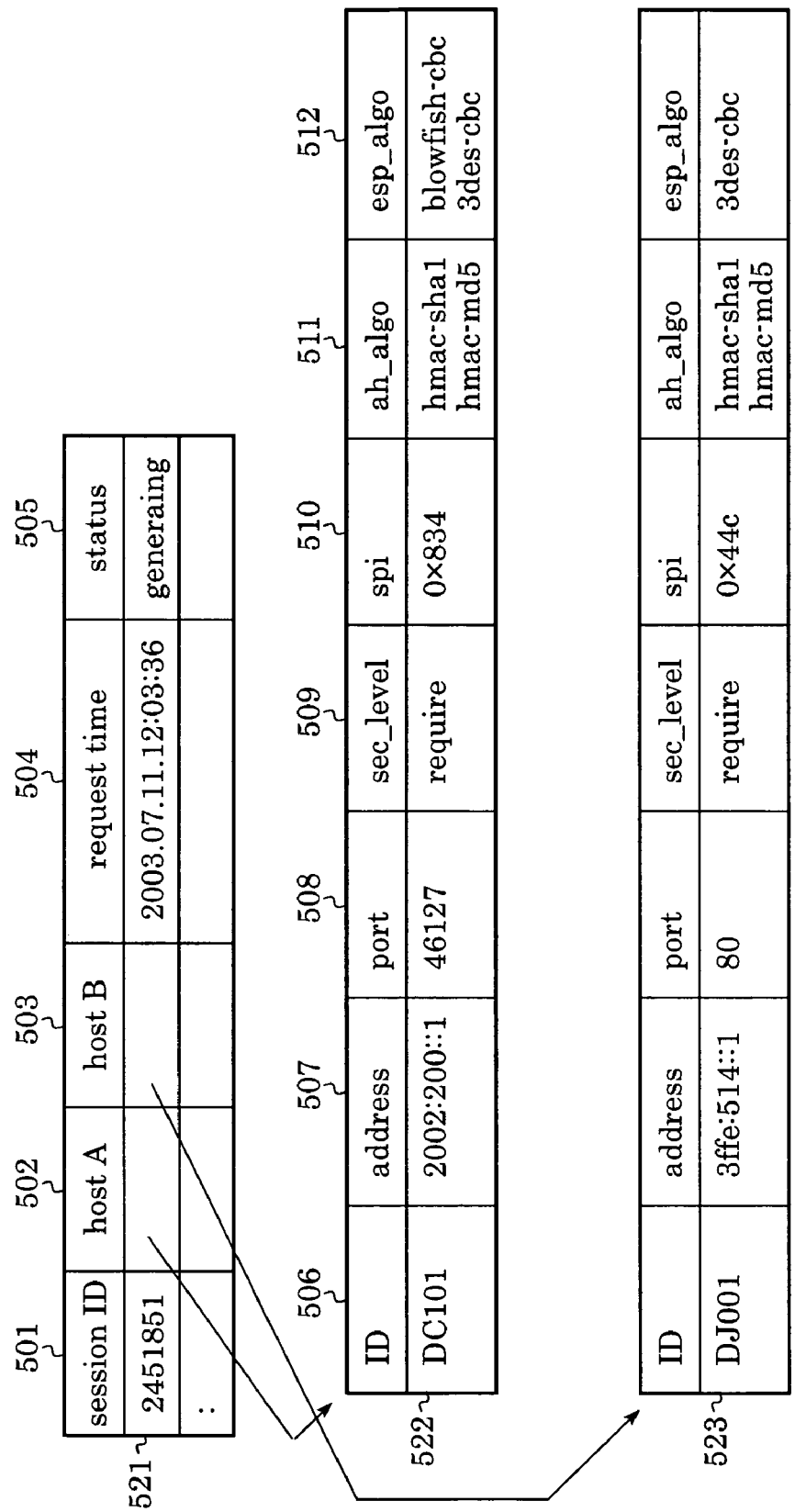
FIG. 5 shows an example of an IPsec generation table.

FIG. 5 shows an example of the IPsec generation table 303 in FIG. 3. The IPsec generation table 303 is provided in the RAM 1503. Referring to FIG. 5, the ID of a session established between the corresponding two devices using the SIP is stored in a session ID 501. Device information concerning the two devices which perform the peer-to-peer communication using the IPsec in the established session is stored in a host A 502 and a host B 503. The device information concerning the source (digital camera 102) of the IPsec request message 406 that is first received is stored in the host A 502 and the device information concerning the other device is stored in the host B 503. The reception time of the IPsec request message that is received last is stored in a request time 504. The information in the request time 504 is used for timeout processing performed when the IPsec request messages are not provided from the two devices using the IPsec, that is, when the IPsec request message is received from the digital camera 102 while the IPsec request message is not received from the printer 101. The status of the IPsec generation table is shown in a status 505. The status 505 has three values: waiting (waiting for the IPsec request message 407 from the other device), generating (generating the IPsec settings), and sent (the replies 409 and 410 to the IPsec request messages are completed).

The device information stored in the host A 502 and the host B 503 will now be described in detail. In the host A 502, the device ID of the host A is stored in an ID 506. The IPv6 address used by the host A is stored in an address 507. The port number of the application used in the peer-to-peer communication is stored in a port 508. The IPsec level used in the peer-to-peer communication is stored in a sec_level 509. The IPsec_level has three values: use (use of the IPsec is not essential), require (use of the IPsec is essential), and unique (the SA used in the IPsec is uniquely specified). The value of a security parameter index (SPI) used in the setting of the IPsec is stored in spi 510. The name of an ah (authentication) algorithm owned by the host A is stored in an ah_algo 511. The name of an esp (encryption) algorithm owned by the host A is stored in an esp_algo 512. The names of a plurality of algorithms may be stored in each of the ah_algo 511 and the esp_algo 512. In such a case, the names of the algorithms are stored in order of priority.

Specific entries in the IPsec generation table are shown in a row 521. The device information concerning the host A, stored in the host A 502 in the row 521, is shown in an entry 522. The device information concerning the host B, stored in the host B 503 in the row 521, is shown in an entry 523.

Figure 6:
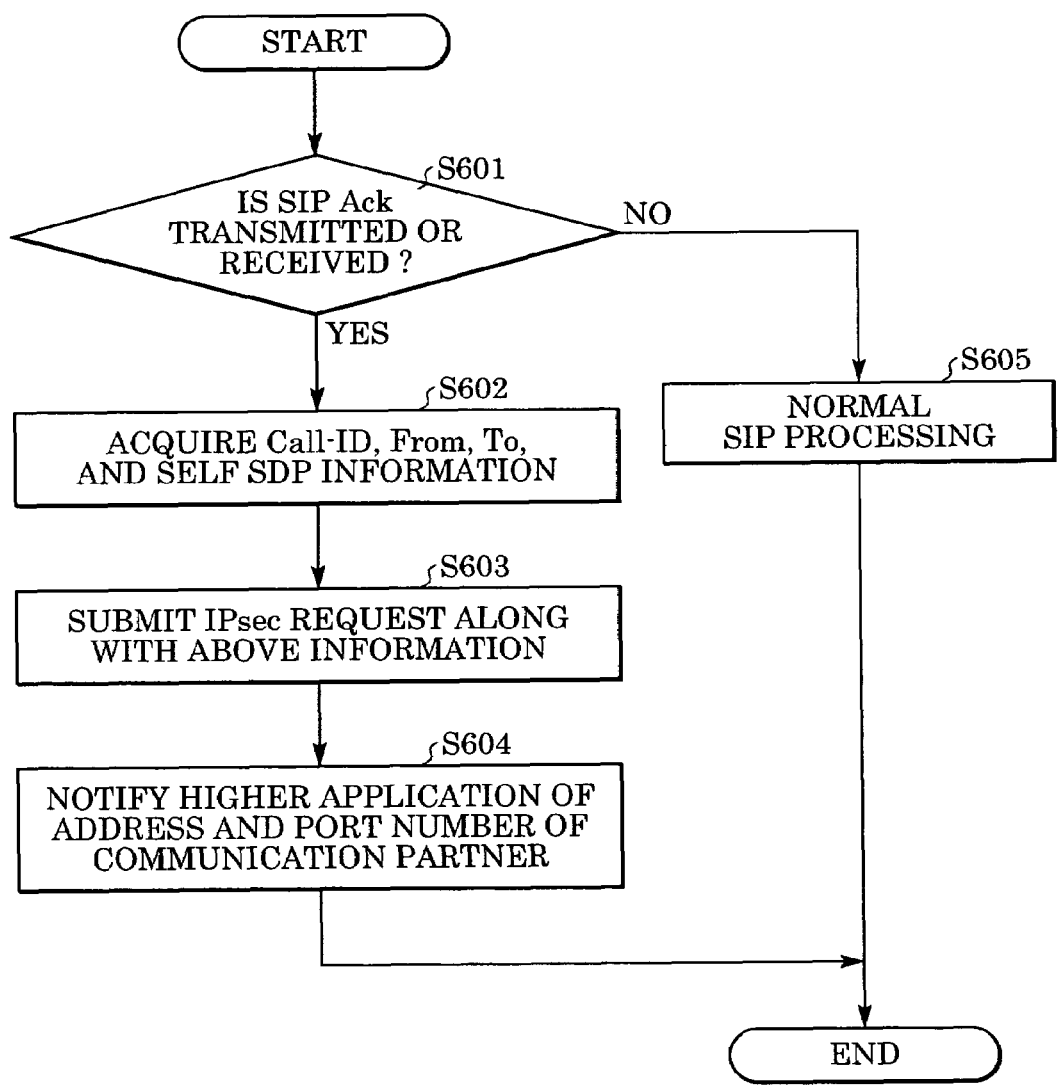
FIG. 6 is a flowchart showing a process of submitting an IPsec request to a request submission module in an SIP Invite process in an SIP module.
Figure 7:
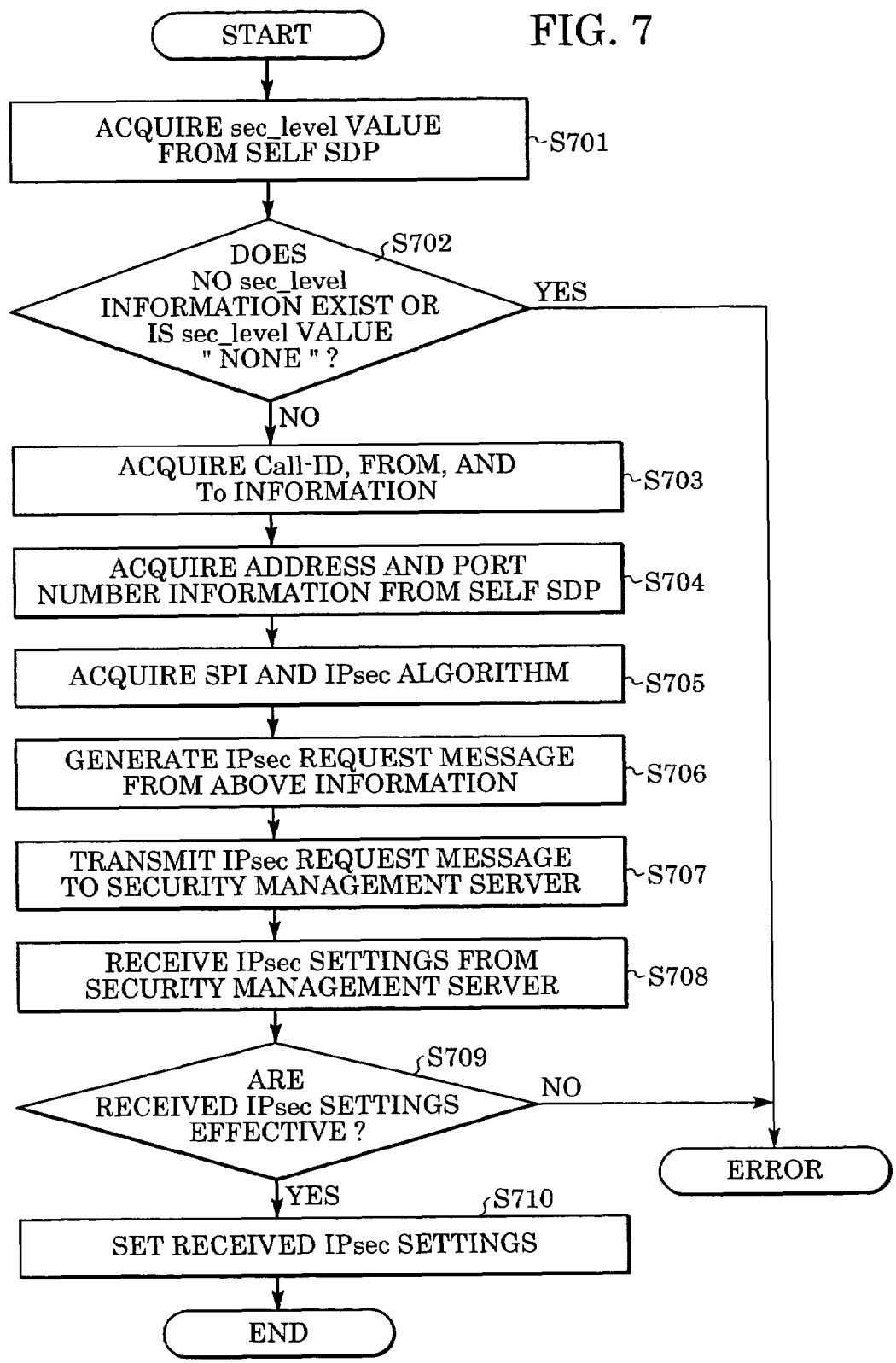
FIG. 7 is a flowchart with a focus on a process in the request submission module, which receives the IPsec request.

FIGS. 6 and 7 are flowcharts at the device side according to an embodiment of the present invention. FIGS. 6 and 7 show part of programs which are stored in the ROM 1502, the HD 1507, or the FD 1508 and which are read out by the CPU 1501.

FIG. 6 is a flowchart showing a process of submitting an IPsec request to the request submission module 312 in the SIP Invite process in the SIP module 315.

Referring to FIG. 6, in Step S601, the process determines a type of the message in the SIP Invite process. If the Ack message 403 (refer to FIG. 4) is transmitted in the SIP Invite process or if the Ack message 403 is received, the process proceeds to Step S602. Otherwise, the process proceeds to Step S605 to perform normal SIP processing. The case in which the Ack message 403 is transmitted corresponds to the digital camera 102 transmitting the Invite request message 401. The case in which the Ack message 403 is received corresponds to the printer 101 transmitting the 200OK message 402.

In Step S602, the process acquires information concerning Call_ID, From, and To and self SDP information from the information concerning the session established in the SIP Invite process. The information acquired here includes the ID of the session established in the previous SIP Invite process, the IDs of the two devices using the session, and a variety of self information. In Step S603, the process submits the IPsec request, along with the above information, to the request submission module 312. In Step S604, the process notifies a higher application of the IPv6 address and port number of the communication partner in response to the IPsec request in Step S603 to perform the peer-to-peer communication between the two devices. If the IPsec request fails, that is, if the IPsec settings are not successfully set or if the use of the IPsec is not specified, the process may notify the higher application of the error and may ask the user to determine whether the peer-to-peer communication is to be performed without using the IPsec.

FIG. 7 is a flowchart with a focus on a process in the request submission module 312, which receives the IPsec request in Step S603.

Referring to FIG. 7, in Step S701, the process acquires a value of the sec_level from the self SDP information received along with IPsec request in Step S603. The SDP information will be described in detail below. In Step S702, the process determines the value of the sec_level acquired in Step S701. If no sec_level information exists in the SDP information or if the value of the sec_level is "none", that is, if the IPsec is not used in the peer-to-peer communication, the process returns an error. If the sec_level has an appropriate value (use, require, or unique), the process proceeds to Step S703.

In Step S703, the process acquires the information concerning the Call_ID, From, and To, received along with the IPsec request in Step S603. In Step S704, the process acquires the IPv6 address and the port number from the self SDP information. In Step S705, the process acquires the IPsec algorithm adopted in the device and an SPI that is currently available. The IPsec algorithm is at least one of the authentication algorithm and the encryption algorithm. The identifier of the IPsec algorithm adopted in the device is acquired from, for example, the HD 1507. In Step S706, the process generates an IPsec request message to be transmitted to the security management server 103 from the information acquired in Steps S701, S703, S704, and S705. The IPsec request message will be described in detail below.

In Step S707, the process transmits the IPsec request message generated in Step S706 to the security management server 103. The process encrypts the message in the encryption communication module 313 and transmits the encrypted message from the communication module 311 to the security management server 103. The printer 101 and the digital camera 102, which are the communication devices that receive the information required to ensure the security of the communication with the communication partner from the security management server (providing apparatus) 103, transmit the IPsec request message including the candidates for the IPsec algorithms (parameters) used to ensure the security to the security management server 103 in Step S707. In Step S707, the printer 101 and the digital camera 102 transmit the Call_ID, which is the identification information identifying the established communication with the communication partner, to the security management server 103.

In Step S708, the process receives the response messages 409 and 410 in response to the IPsec request messages 406 and 407 transmitted in Step S707 and acquires the IPsec settings from the response messages. The received response messages will be described in detail below with reference to FIG. 11. In Step S709, the process checks the effectiveness of the acquired IPsec settings. If the acquired IPsec settings are not effective, that is, for example, if the security management server 103 returns an error, the process returns an error. If the acquired IPsec settings are effective, the process proceeds to Step S710. In Step S710, the process passes the IPsec settings whose effectiveness is checked to the IPsec setting module 314 and sets the IPsec settings in the kernel of the corresponding device using a "setkey" command.

The printer 101 and the digital camera 102, which are the communication devices that receive the information required to ensure the security of the communication with the communication partner from the security management server (providing apparatus) 103, receive the IPsec settings, which are the information required to ensure the security, from the security management server 103 in Step S708 and ensure the security of the communication with the communication partner based on the IPsec settings received from the security management server 103 in Step S710.

The printer 101 and the digital camera 102 ensure the security of the established communication (the communication established by transmitting and receiving the Invite request message 401, the response message 402, and the Ack message 403) with the communication partner based on the IPsec settings received from the security management server 103.

The following is an example of the above SDP.
v=0
o=BJ001 245185 112144870 IN IP6 3ff:514::1
s=-
c=IN IP6 3ffe:514::1
t=0 0
m=application 80 HTTP
k=ipsec_level:require This example shows the content of the SDP of the printer 101. The important information will now be described. "3ff:514::1" in the second line denotes the IPv6 address of the printer 101. The IPv6 address is also described in the fourth line. "80" in the sixth line denotes the port number of the application. The use of the "HTTP" protocol is shown in this sixth line. The seventh line describes the sec_level. In this example, the sec_level is set to "require". The sec_level is acquired in request submission module 312 in Step S701 in FIG. 7. The IPv6 address described in the second or fourth line and the port number described in the sixth line are acquired in the request submission module 312 in Step 704. The SDP is stored in, for example, the HD 1507.

The following is an example of the IPsec request message generated in Step S706 in FIG. 7.

```
<ipsec-request>
    <session-id>2451851</session-id>
    <local-host>DC101</local-host>
    <remote-host>BJ101</remote-host>
    <ipv6-address>2002:200::1</ipv6-address>
    <port>46127</port>
    <level>require</level>
    <spi>0x834</spi>
    <ah-algo>hmac-sha1</ah-algo>
    <ah-algo>hmac-md5</ah-algo>
    <esp-algo>belowfish-cbc</sep-algo>
    <esp-algo>3des-cbc</esp-algo>
</ipsec-request>
```

This example shows the IPsec request message transmitted from the digital camera 102. The data is described in an extensible markup language (XML) format and is enclosed in the <ipsec-request> tags. The XML format in which the data is described is not important in this embodiment, and the data may be described in any format that would enable practice of the present invention.

Each of the entries will be described. The information enclosed in the <session-id> tags indicates the ID of the session established between the digital camera 102 and the printer 101. The information enclosed in the <local-host> tags indicates the device ID of the digital camera 102. The information enclosed in the <remote-host> tags indicates the device ID of the printer 101, which is the partner of the digital camera 102 in the peer-to-peer communication. The information enclosed in the <ipv6-address> tags indicates the IPv6 address of the digital camera 102. The information enclosed in the <port> tags indicates the port number used by the application in the digital camera 102. The information enclosed in the <level> tags indicates the IPsec level (sec_level) in the digital camera 102. In a case in which the IPsec level is negotiated, the IPsec level in the digital camera 102 is the same as that in the printer 101, which is the partner in the peer-to-peer communication. The sec_level is set to use, require, or unique. The information enclosed in the <spi> tags indicates the value of the SPI of the digital camera 102.

The information enclosed in the <ah-algo> tags indicates the ah (authentication) algorithm owned by the digital camera 102. The information enclosed in the <esp-algo> tags indicates the esp (encryption) algorithm owned by the digital camera 102. The digital camera 102 may own multiple authentication algorithms and/or encryption algorithms. In such a case, the algorithms are described in order of priority in the <ah-algo> tags and/or the <esp-algo> tags. At least one of the ah (authentication) algorithm in the <ah-algo> and the esp (encryption) algorithm in the <esp-algo> is the security setting candidate information or the candidate for the parameter used for the secure communication.

In the manner described above, the digital camera 102 transmits the IPsec request message (encryption-communication-setting request message) 406 including the security setting candidate information to the security management server 103. The printer 101 transmits the IPsec request message (encryption-communication-setting request message) 407 including the security setting candidate information to the security management server 103.

The digital camera 102 and the printer 101 start the encryption communication using the IPsec between the digital camera 102 and the printer 101 based on the received IPsec settings in the manner described above.

Figure 8:
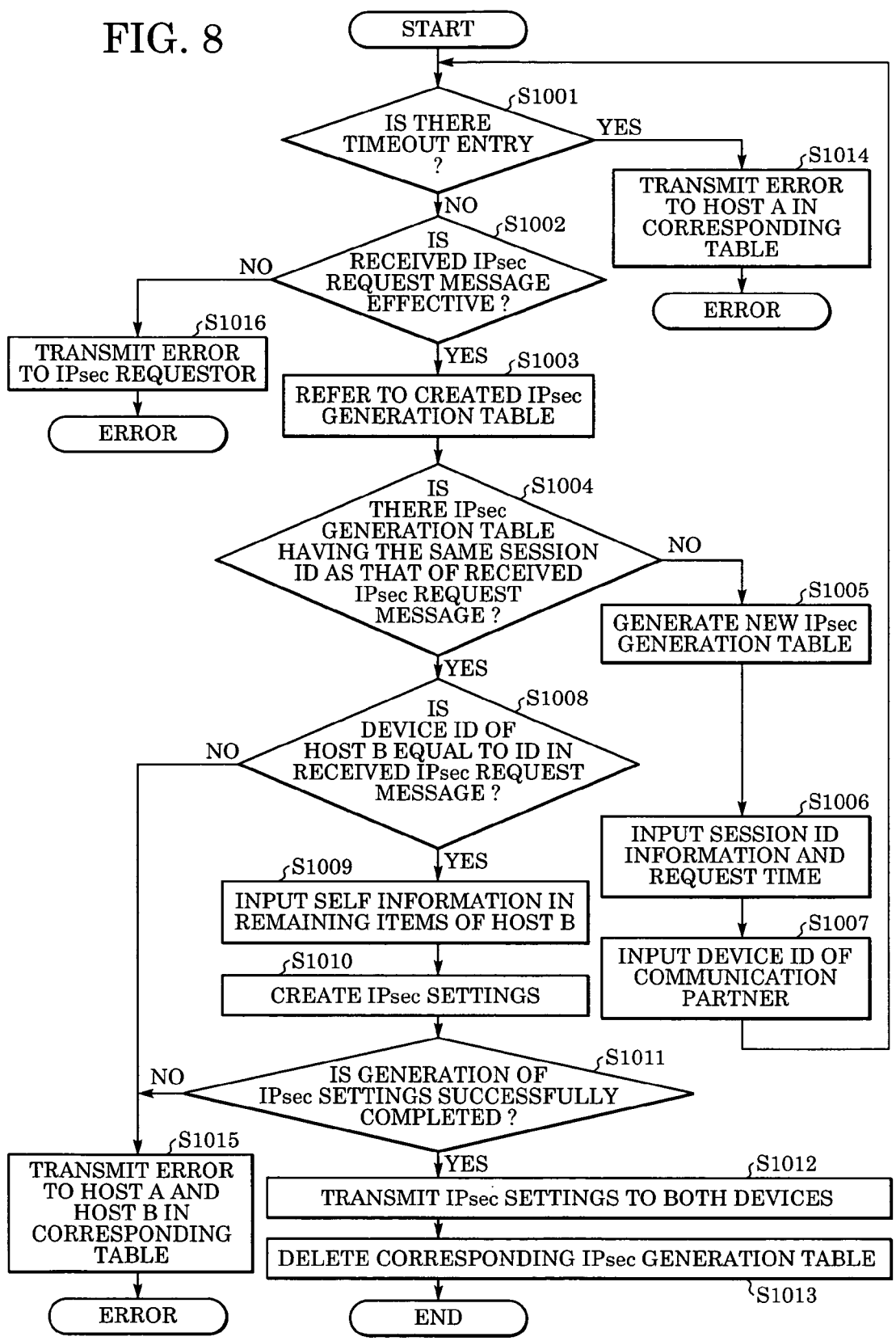
FIG. 8 is a flowchart with a focus on a process of receiving an IPsec request message and returning IPsec settings in a request acceptance module.
Figure 9:
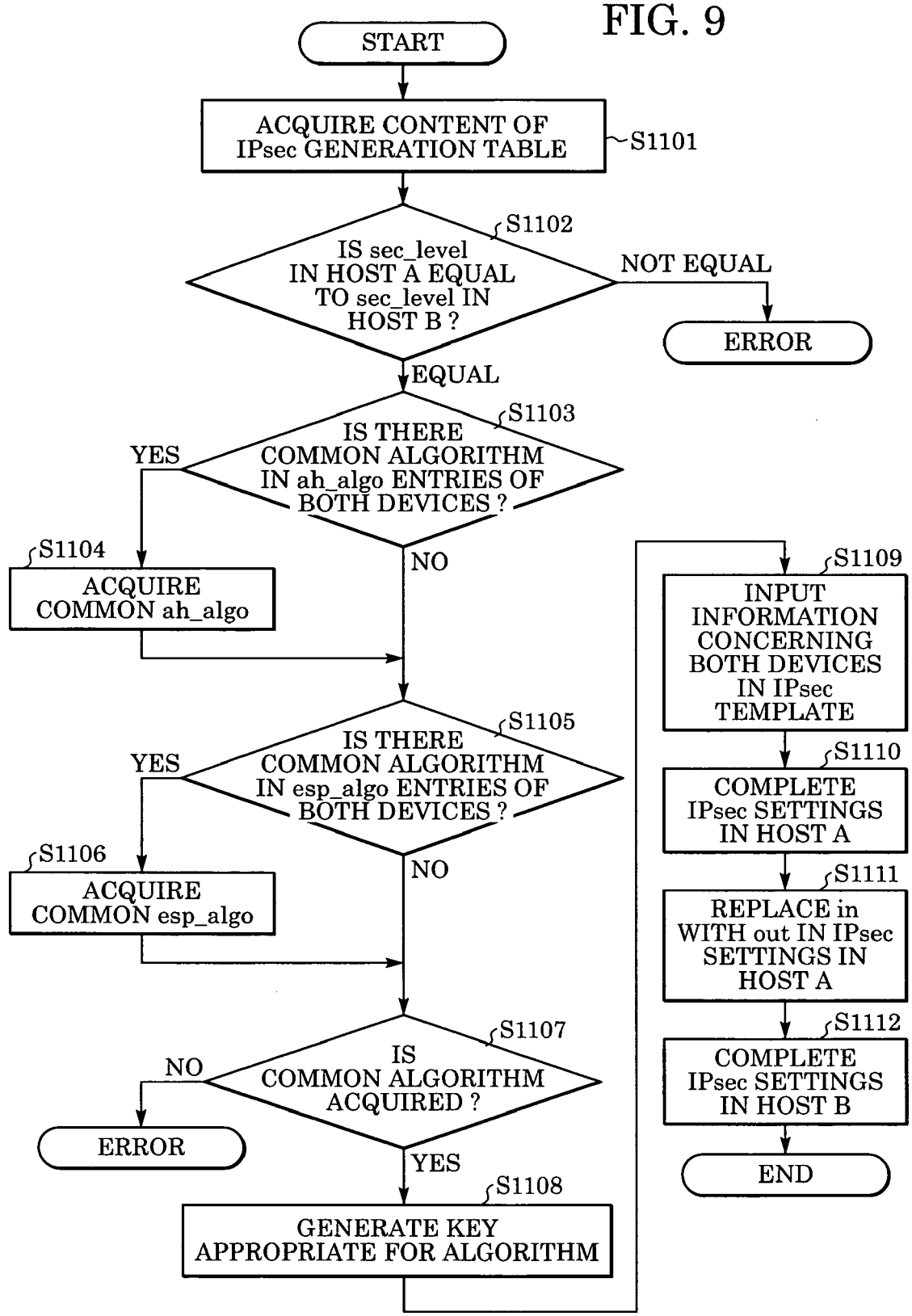
FIG. 9 is a flowchart showing a process in an IPsec setting module.

FIGS. 8 and 9 are flowcharts at the security management server side according to embodiments of the present invention. FIGS. 8 and 9 show part of programs which are stored in the ROM 1502, the HD 1507, or the FD 1508 and which are read out by the CPU 1501.

FIG. 8 is a flowchart with a focus on a process of receiving the IPsec request message and returning the IPsec settings in the request acceptance module 302. Particularly, a process of establishing a session for the peer-to-peer communication between the digital camera 102 and the printer 101, receiving the first IPsec request message from the digital camera 102, and receiving the IPsec request message from the printer 101 immediately after the reception from the digital camera 102 will be described herein.

Referring to FIG. 8, in Step S1001, the security management server 103 determines whether a timeout occurs in the IPsec request processing. In the IPsec request processing, the security management server 103 creates the IPsec settings by receiving the IPsec request messages 406 and 407 from the two devices upon establishment of the session between the two devices using the SIP. Accordingly, if the IPsec request message cannot be received from one of the two devices for some reason (e.g., if the IPsec request message 406 can be received from the digital camera 102 but the IPsec request message 407 cannot be received from the printer 101), the IPsec settings cannot be created and the digital camera 102, which normally transmits the IPsec request message 406, continues to wait for the IPsec settings. In order to avoid such a situation, the security management server 103 checks the value of the request time 504 and the value of the status 505 in Step S1001. If there is an entry having waiting in the status 505 and a time older than the current time by five or more seconds in the request time 504, the security management server 103 determines that a timeout occurs. If the security management server 103 determines that a timeout occurs, then in Step S1014, the security management server 103 returns an error to the digital camera 102 and finishes the process. If there is no timeout entry, the security management server 103 proceeds to Step S1002.

In Step S1002, the security management server 103 receives the IPsec request message, acquires data enclosed in the <level> tags from the received IPsec request message, and determines the value of the acquired data. If the value of the acquired data does not coincide with user, require, or unique, that is, if the received IPsec request message is not an effective IPsec request, then in Step S1016, the security management server 103 transmits an error to the source of the IPsec request message and finishes the process. If the value of the acquired data coincides with user, require, or unique, the security management server 103 proceeds to Step S1003.

The security management server 103, which is the providing apparatus that provides the information required for the secure communication to the digital camera (first device) 102 and the printer (second device) 101, receives the IPsec request messages, including the candidates for the parameters used for the secure communication, from the digital camera 102 and the printer 101, in Step S1002. The security management server 103 receives the session ID, which is the identification information identifying the communication between the digital camera 102 and the printer 101, from the digital camera 102 and the printer 101, in Step S1002 as well.

In Step S1003, the security management server 103 refers to the IPsec generation table, which already exists in the IPsec generation table 303. In Step S1004, the security management server 103 compares the session ID 501 in the IPsec generation table with the information enclosed in the <session-id> tags in the received IPsec request message and extracts the IPsec generation table having the same session ID as that of the received IPsec request message. If there is no IPsec generation table having the same session ID as that of the received IPsec request message, that is, if the security management server 103 receives the IPsec request message 406 (FIG. 4) from the digital camera 102, the security management server 103 proceeds to Step S1005. If there is an IPsec generation table having the same session ID as that of the received IPsec request message, that is, if the security management server 103 receives the IPsec request message 407 from the printer 101, the security management server 103 proceeds to Step S1008.

If the security management server 103 receives the first IPsec request message (the IPsec request message 406 from the digital camera 102), then in Step S1005, the security management server 103 generates a new IPsec generation table. Next, in Step S1006, the security management server 103 acquires the information concerning the session ID from the received IPsec request message and also acquires the reception time of the IPsec request message. The security management server 103 stores the session ID in the session ID 501 and the reception time in the request time 504, and sets the status 505 to waiting. The security management server 103 adds the information concerning the device (digital camera 102), which transmits the IPsec request message, to the IPsec generation table.

Specifically, the security management server 103 stores the information in the received IPsec request message 406 in the ID 506 to the esp_algo 512 (the device ID, the address, the port number, the IPsec level, the value of the SPI, the authentication algorithm, and the encryption algorithm of the digital camera 102) in the host A 502 (FIG. 5). In Step S1007, the security management server 103 adds the information concerning the device (printer 101), which is the communication partner of the device that transmits the IPsec request message, to the IPsec generation table generated in Step S1005. Specifically, the security management server 103 stores only the device ID of the communication partner (the device ID of the printer 101) in the host B 503. The processing of the IPsec request message from the digital camera 102 is then finished.

The security management server 103 then waits for the IPsec request message from the printer 101. When the security management server 103 receives the IPsec request message 407 from the printer 101, the security management server 103 proceeds to Steps S1001, S1002, S1003, and S1004, and acquires the IPsec generation table having the session ID equal to the information enclosed in the <session-id> tags in the received IPsec request message from the IPsec generation table 303. The security management server 103 then proceeds to Step S1008.

In Step S1008, the security management server 103 compares the device ID of the host B in the acquired IPsec generation table with the value enclosed in the <local-host> tags in the received IPsec request message. In this step, the security management server 103 determines whether the first IPsec request message (the IPsec request message 406 from the digital camera 102) and the received IPsec request message (the IPsec request message 407 from the printer 101) specify the device IDs of the printer 101 and the digital camera 102, respectively. Specifically, in the IPsec request message from the digital camera 102, the security management server 103 determines whether the device ID of the printer 101 is specified as the information enclosed in the <remote-host> tags. In the IPsec request message from the printer 101, the security management server 103 determines whether the device ID of the digital camera 102 is specified as the information enclosed in the <remote-host> tags. If the determination is affirmative, the security management server 103 proceeds to Step S1009. If the determination is negative, the security management server 103 proceeds to Step S1015 and returns errors to the digital camera 102 and the printer 101.

In Step S1009, the security management server 103 adds the information concerning the device (printer 101) that transmits the received IPsec request message to the IPsec generation table. Specifically, the security management server 103 stores the information in the received IPsec request message 407 in the address 507 to the esp_algo 512 (the address, the port number, the IPsec level, the value of the SPI, the authentication algorithm, and the encryption algorithm of the printer 101) in the host B 503 (FIG. 5). The security management server 103 then changes the value in the request time 504 to a time when the IPsec request message 407 is received from the printer 101 and changes the value of the status 505 to generating.

Next, in Step S1010, the security management server 103 supplies the information in the completed IPsec generation table to the IPsec setting module 305 and requests the IPsec setting module 305 to create the IPsec settings. The process of creating the IPsec settings will be described in detail below with reference to FIG. 9. The security management server 103, which is the providing apparatus that provides the information required for the secure communication to the digital camera (first device) 102 and the printer (second device) 101, generates the information required for the secure communication based on the candidates for the authentication algorithm and the encryption algorithm (parameters) received from the digital camera 102 and the printer 101, in Step S1010.

In Step S1011, the security management server 103 determines whether the creation of the IPsec settings in Step S1010 is successfully completed. If the creation of the IPsec settings fails, the security management server 103 proceeds to Step S1015. If the creation of the IPsec settings succeeds, the security management server 103 acquires the IPsec settings to be returned to the digital camera 102 and the printer 101 and proceeds to Step S1012. In Step S1012, the security management server 103 encrypts the IPsec settings created for the digital camera 102 and the printer 101 in the encryption communication module 304 and transmits the encrypted information to the digital camera 102 and the printer 101 from the communication module 301. In Step S1012, the security management server 103 transmits the IPsec settings 409 for the digital camera 102 to the digital camera 102 through the communication channel formed by using the first secret symmetric keys owned by the security management server 103 and the digital camera 102, and the security management server 103 transmits the IPsec settings 410 for the printer 101 to the printer 101 through the communication channel formed by using the second secret symmetric keys owned by the security management server 103 and the printer 101.

The security management server 103, which is the providing apparatus that provides the information required for the secure communication to the digital camera (first device) 102 and the printer (second device) 101, transmits the created IPsec settings (the information required for the secure communication) to the digital camera 102 and the printer 101, in Step S1012. The security management server 103 transmits the IPsec settings to the digital camera 102 and the printer 101, in Step S1012, in order to ensure the security of the communication identified by the session ID, which is the identification information.

Upon completion of the transmission, the security management server 103 changes the value of the status 505 in the IPsec generation table to "sent". Then, in Step S1013, the security management server 103 deletes the corresponding IPsec generation table. The security management server 103 deletes the IPsec generation table after confirming that the value of the status 505 in the IPsec generation table is set to "sent".

FIG. 9 is a flowchart showing a process in the IPsec setting module 305. In this process, the IPsec settings for the peer-to-peer communication are created for the digital camera 102 and the printer 101 in response to the request for the creation of the IPsec settings in Step S1010.

In Step S1101, the security management server 103 acquires the content of the specified entry from the IPsec generation table in the IPsec setting module 305, which receives the request for the creation of the IPsec settings. In Step S1102, the security management server 103 compares the value of the sec_level in the information concerning the digital camera 102 with the value of the sec_level in the information concerning the printer 101 in the information acquired from the IPsec generation table. If the value of the sec_level in the information concerning the digital camera 102 does not coincide with the value of the sec_level in the information concerning the printer 101, the security management server 103 returns an error. In a mode in which the digital camera 102 and the printer 101 notify self information using the SDP in the SIP Invite processing and negotiation is performed for communication in a common security policy, the value of the sec_level set in the digital camera 102 coincides with the value of the sec_level set in the printer 101 in the comparison in Step S1102. If the value of the sec_level set in the digital camera 102 coincides with the value of the sec_level set in the printer 101, the security management server 103 proceeds to Step S1103.

In Step S1103, the security management server 103 compares the data in the ah_algo set in the digital camera 102 with the data in the ah_algo set in the printer 101 to determine whether a common authentication algorithm exists. If an authentication algorithm common to the digital camera 102 and the printer 101 exists, the security management server 103 proceeds to Step S1104. In Step S1104, the security management server 103 acquires an identifier of the authentication algorithm common to the digital cameras 102 and the printer 101. When the IPsec generation table 303 has the content shown in FIG. 5, "hmac-shall" is acquired in Step S1104. If a common authentication algorithm does not exist, the security management server 103 proceeds to Step S1105.

In Step S1105, the security management server 103 compares the data in the esp_algo set in the digital camera 102 with the data in the esp_algo set in the printer 101 to determine whether a common encryption algorithm exists. If an encryption algorithm common to the digital camera 102 and the printer 101 exists, the security management server 103 proceeds to Step S1106. In step S1106, the security management server 103 acquires an identifier of the encryption algorithm common to the digital camera 102 and the printer 101. If a common encryption algorithm does not exist, the security management server 103 proceeds to Step S1107. In Step S1107, the security management server 103 determines whether a common algorithm is acquired in Step S1104 or Step S1106. When the IPsec generation table 303 has the content shown in FIG. 5, "3des-cbc" is acquired in Step S1107. If neither a common authentication algorithm nor a common encryption algorithm is acquired, the security management server 103 returns an error.

If a common algorithm is required, then the process proceeds to Step S1108, where the security management server 103 generates keys appropriate for the authentication algorithm and the encryption algorithm based on the information concerning the authentication algorithm and the encryption algorithm acquired in Step S1104 and Step S1106, respectively. The keys are generated by using random numbers and the lengths of the keys are adjusted to ones appropriate for the authentication and encryption algorithms. The relationship between the algorithms and the lengths of the keys will be described in detail below. The security management server 103, which is the providing apparatus that provides the information required for the secure communication to the digital camera (first device) 102 and the printer (second device) 101, generates the information required for the secure communication (the authentication algorithm, the encryption algorithm, and the keys used in the secure communication between the digital camera 102 and the printer 101) based on the candidates for the authentication algorithm and the encryption algorithm (parameters) received from the digital camera 102 and the printer 101.

Next, in Step S1109, the security management server 103 inputs appropriate information, including the information in the IPsec generation table acquired in Step S1101, the information concerning the authentication algorithm, the encryption algorithm, and the keys acquired in Step S1104 and S1106 and generated in Step S1108, respectively, in an IPsec setting template to create the IPsec settings. The IPsec setting template will be described in detail below with reference to FIG. 10. In Step S1110, the security management server 103 sets the created IPsec settings as the IPsec settings for the device (digital camera 102) at the side of the host A.

In Step S1111, the security management server 103 modifies part of the IPsec settings created in Step S1109. Specifically, the description in "in" is replaced with the description in "out", which define the direction of the communication, in the settings for a security policy (SP). In Step S1112, the security management server 103 sets the IPsec settings modified in Step S1111 as the IPsec settings for the device (printer 101) at the side of the host B.

The relationship among the authentication algorithm, the encryption algorithm, and the lengths of the keys in Step S1108 will now be described. For example, when "hmac-sha1" is selected as the authentication algorithm, a key having a length of 160 bits is generated corresponding to the authentication algorithm. When "3des-cbc" is selected as the encryption algorithm, a key having a length of 64 bits is generated corresponding to the encryption algorithm. When "hmac-md5" is selected as the authentication algorithm, a key having a length of 128 bits is generated. In an encryption algorithm "blowfish-cbc", a key having any length from 40 bits to 448 bits can be generated. In an encryption algorithm "rijndae1-cbc", a key having any length of 128 bits, 192 bits, and 256 bits can be generated.

FIG. 10 shows an example of the IPsec setting template in Step S1109. Although the example is described in the format of "setkey" command for setting the IPsec, the template is not limited to this format and any format that would enable practice of the present invention is applicable. The first and second lines show the information concerning the SP and the third to sixth lines show the information concerning the SA. The IPsec settings are completed by assigning the IPsec generation table or the information concerning the generated keys in <> entries in FIG. 10. The meaning of each entry will now be described.

The IPv6 address of the device at the side of the host A is assigned in <A_addr>. The Ipv6 address of the device at the side of the host B is assigned in <B_addr>. The port number of the device at the side of the host A is assigned in <A_port>. The port number of the device at the side of the host B is assigned in <B_port>.

The type(s) of the common algorithm(s) acquired in Steps S1104 and S1106 is assigned in <sec_type>. Specifically, if an authentication algorithm and an encryption algorithm common to the two devices are acquired, "ah" and "esp" are assigned in <sec_type>. If only an authentication algorithm is acquired, "ah" is assigned in <sec_type>. If only an encryption algorithm is acquired, "esp" is assigned in <sec_type>. A sec_level common to the two devices is assigned in <sec_level>. The authentication algorithm and the encryption algorithm are selected from among the candidates for the authentication algorithm and the encryption algorithm (parameters used for the secure communication) received from the digital camera 102 and the printer 101.

If "ah" and "esp" are specified in <sec_type>, that is, both the authentication and the encryption are used, "<sec_type>/transport//<sec_level>" is repeatedly set. For example, "~ah/transport//require esp/transport//require~" is described. The authentication and the encryption are described as essential in this example.

The SPI of the device at the side of the host A is assigned in <A_spi>. The SPI of the device at the side of the host B is assigned in <B_spi>.

When only "ah" is used in <sec_type>, the SA registrations relating to the "esp" in the fourth and sixth lines are deleted. When only "esp" is used in <sec_type>, the SA registrations relating to "ah" in the third and fifth lines are deleted.

When both "ah" and "esp" are used in <sec_type>, specific lines are not deleted from the template and different values incremented by one are input in the multiple <A_spi> and <B_spi>. Specifically, when the SPI of the device at the side of the host A is 0x834, "0x835" is assigned in the <A_spi> in the fifth line and "0x835" is assigned in the <A_spi> in the sixth line. The authentication algorithm and the encryption algorithm common to the two devices, acquired in Steps S1104 and S1106, are assigned in <ah_algo> and <esp_algo>, respectively. The keys generated in Step S1108 for the authentication and the encryption are assigned in <ah_key> and <esp_key>. The keys for the authentication and the encryption are generated based on candidates for the authentication algorithm and the encryption algorithm (parameters used for the secure communication) received from the digital camera 102 and the printer 101.

FIG. 11 shows examples of the IPsec settings. Particularly, the data in FIG. 11 shows the IPsec settings to be transmitted to the digital camera 102. The data is described in the XML format. The data is enclosed in <ipsec-data> tags and the data enclosed in the <ipsec-data> tags is further enclosed in <ipsec-response> tags. The XML format in which the data is described is not important in this embodiment, and the data may be described in any format that would enable practice of the present invention.

As described above, the security management server 103 acquires the authentication algorithm and the encryption algorithm (security setting candidate information) of the digital camera 102, included in the IPsec request message 406 (encryption-communication-setting request message) transmitted from the digital camera 102, and acquires the authentication algorithm and the encryption algorithm (security setting candidate information) of the printer 101, included in the IPsec request message (encryption-communication-setting request message) 407 transmitted from the printer 101.

The security management server 103 creates the IPsec settings (encryption key (session key) used in the encryption communication and the security setting information) for the digital camera 102 and the printer 101 after receiving the IPsec request message 406 from the digital camera 102 and IPsec request message 407 from the printer 101 (Steps S1108 to S1112).

The security management server 103 transmits the IPsec settings 409 for the digital camera 102 to the digital camera 102 and transmits the IPsec settings 410 for the printer 101 to the printer 101.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-104635 filed Mar. 31, 2004, which is hereby incorporated by reference herein.

What is claimed is:

1. A secure communication method in which a providing apparatus receives candidates for parameters used for secure communication from first and second devices and generates information required for the secure communication on the basis of the candidates for the parameters received from the first and second devices and in which the first and second devices ensure the secure communication between the first and second communication devices on the basis of the generated information required for the secure communication, comprising the steps of:
   transmitting, by the first device, a session establishment request message to request the establishment of a session to the second device via the providing apparatus;
   transmitting, by the second device, a response message as a reply to the session establishment request message to the first device via the providing apparatus;
   transmitting, by the first device, an acknowledgement message indicating the acceptance of the response message to the second device and a first secure communication request message to request for secure communication to the providing apparatus;
   transmitting, by the second device, a second secure communication request message to request for secure communication to the providing apparatus when the second device recognizes, based on the acknowledgement message from the first device, that the first device, which transmitted the session establishment request message, accepted the response message; and
   providing, by the providing apparatus, the information required for the secure communication to the first and second devices when receiving the first secure communication request message from the first device and the second secure communication request message from the second device.

2. The secure communication method according to claim 1, wherein the required information is one of an authentication algorithm and an encryption algorithm.

3. The secure communication method according to claim 1, wherein the required information is a key to ensure the secure communication.

4. A secure communication method in which a providing apparatus receives identification information identifying a session between first and second devices and candidates for parameters used to ensure secure communication from the first and second devices and generates information required to ensure the secure communication on the basis of the candidates for the parameters received from the first and second devices and in which the first and second devices ensure the secure communication between the first and second communication devices on the basis of the generated information required to ensure the secure communication, comprising the steps of:
   transmitting, by the first device, a session establishment request message to request the establishment of a session to the second device via the providing apparatus;
   transmitting, by the second device, a response message as a reply to the session establishment request message to the first device via the providing apparatus;
   transmitting, by the first device, an acknowledgement message indicating the acceptance of the response message to the second device and a first secure communication request message to request for secure communication to the providing apparatus;
   transmitting, by the second device, a second secure communication request message to request for secure communication to the providing apparatus when the second device recognizes, based on the acknowledgement message from the first device, that the first device, which transmitted the session establishment request message, accepted the response message; and
   providing, by the providing apparatus, the information required to ensure the secure communication to the first and second devices when receiving the first secure communication request message from the first device and the second secure communication request message from the second device.

5. The secure communication method according to claim 4, wherein the candidates for the parameters are candidates for one of an authentication algorithm and an encryption algorithm.

6. The secure communication method according to claim 4, wherein the required information is one of an authentication algorithm and an encryption algorithm.

7. The secure communication method according to claim 4, wherein the required information is a key to ensure the secure communication.

* * * * *